Nov. 20, 1928.  
J. R. MILLEN  
BABY CART  
Original Filed Jan. 14, 1926
1,692,135
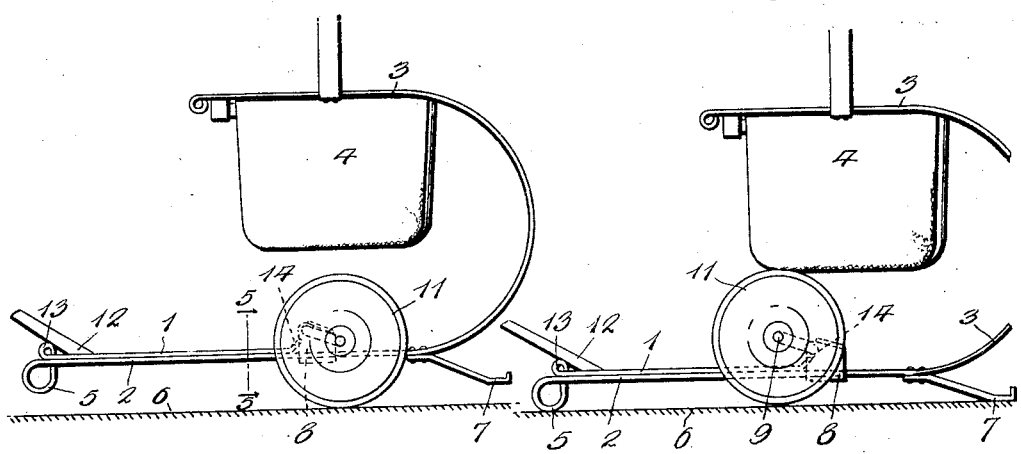
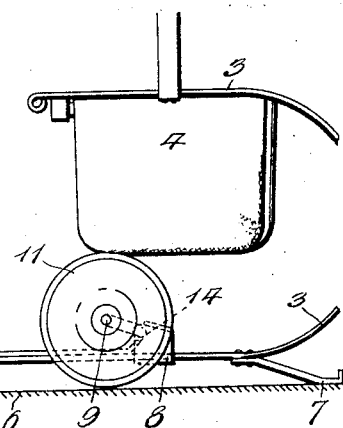
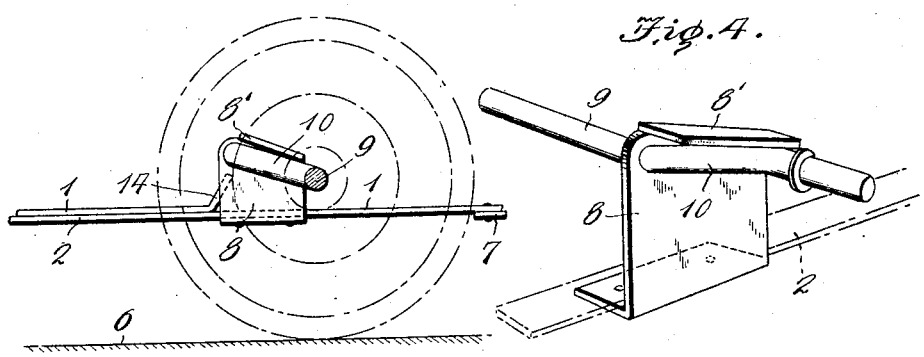
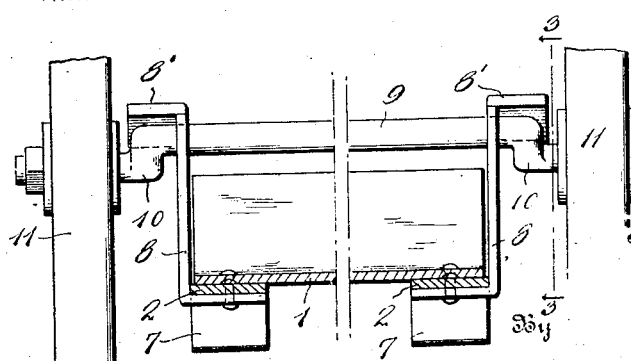
Inventor  
James R. Millen  
By E. H. Bond  
Attorney Patented Nov. 20, 1928.

1,692,135

UNITED STATES PATENT OFFICE.

JAMES R. MILLEN, OF FLINT, MICHIGAN.

BABY CART.

Application filed January 14, 1926, Serial No. 81,206. Renewed September 22, 1928.

This invention pertains to baby carts or analogous class of devices, and it has for its objects among others to provide a desirable form of such cart having its wheels mounted upon an axle of such character that when the cart is not in motion it may be, by quick and easy manipulation, so positioned that the cart will be practically locked against movement, so that it may be with safety allowed to stand in any desired position while the person having charge of the occupant of the cart goes into a store or other place without fear of the occupant of the cart starting the same in motion even when on a sharp grade.

The present invention resides, broadly, in so mounting the axle having offset end portions carrying the wheels that when the offset portions extend forwardly of the axial centre of the axle the body portion of the cart is elevated from the ground so that it may be rolled along but when the offset portions are extended rearwardly of such axial centre the body portion will be lowered so as to rest upon the ground. The construction is such that the wheels of the cart rest upon the ground substantially midway of the length of the cart whether the body of the cart is in its elevated or lowered position and thus has a substantial support front and rear and intermediate these points and there is less liability of the child moving or rocking the cart while left alone. This change of position may be readily accomplished by a quick movement of the handle by which the cart is propelled.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon form a part of this specification, and in which Figure 1 is a side elevation showing the body elevated as in being propelled.

Figure 2 is a similar view showing the body in its lowered position.

Figure 3 is a vertical cross section as on the line 3—3 of Figure 5, looking in the direction of the arrows.

Figure 4 is a perspective detail showing one end of the axle and its mounting.

Figure 5 is a vertical cross section, as on the line 5—5 of Figure 1, looking in the direction of the arrows.

Figures 3, 4 and 5 are on an enlarged scale.

Like numerals of reference indicate like parts throughout the several views in which they appear.

Referring to the drawings 1 designates the platform or base of the vehicle. It is supported at its opposite sides on the longitudinally-extending side members 2, 2 which may be integral with the supporting springs 3, 3, one on each side of the cart, or upon members secured to such springs, as may be found most expedient. These springs, as well as the body or seat portion 4, may be of any well known or preferred form and construction, as they do not enter into the operation of the axle and its accessories, the seat portion being carried by the springs in any suitable manner. Hence, a detailed description of these parts of the vehicle does not seem necessary.

The rear end of each side member 2 is provided with a rest portion 5, which in the present instance is shown as being formed by a curl or bend of the end of the said side portion, although it may be of other construction and form. This rest portion 5 is designed to rest upon the surface 6, the ground or a floor, when the cart is not being propelled, as seen in Figure 2. When the cart is being propelled the rest portions 5 are elevated from the surface 6 as seen in Figure 1. The springs are provided to the rear of the axle with the members 7 of any suitable nature, which are designed to rest upon the surface 6 when the cart is not in use, as seen in Figure 2, and to be elevated from such surface when the cart is being propelled.

Secured to the side members 2 in any suitable manner, at points substantially in vertical alignment with the vertical centre of the seat 4, are the substantially Z-shaped members 8, the horizontal portions at the lower ends being secured to the members 2 in any suitable manner and the upper outwardly-disposed members 8' extended outward laterally for a purpose soon to be described, and as seen clearly in Figures 4 and 5.

9 is the axle; it is journalled in the vertical members of the parts 8 as seen clearly in Figures 4 and 5 and has at each end an offset portion 10 on the outer ends of which are carried the wheels 11, which may be of any suitable form and make.

The cart may be propelled by a suitable handle 12 as indicated in Figures 1 and 2.

The rear end of the platform 1 may have an upturned end as seen at 13, and its forward end may have either a turned up portion 14 or other provision substantially in vertical alignment with the axle as seen in Figure 3; or the platform may be straight at both ends.

In use, when it is desired to place the device in position to be moved along the ground or other surface the axle is turned so that it assumes the position seen in Figure 1, the cranked or offset portions being extended toward the foot member 7; this brings the said offset portions beneath the portions 8' of the Z-shaped members 10 as seen in Figures 1, 3 and 4 and the platform is thus raised so that its supporting members 5 and 7 are elevated from the surface 6 and the cart may be propelled as may be desired. When it is desired to lower the platform the handle is actuated to throw the offset portions 10 into the opposite position, that indicated by dotted lines in Figure 2, so that the said offset portions no longer contact with the members 8', and the whole device drops so that it rests upon the members 5 and 7 as seen in Figure 2. This, in practice, may be readily accomplished by a slight movement of the handle to throw the offset portions from the one position to the other, and movement in the reverse direction, of course, will put the parts in position so that the body will be elevated from the ground. Change of position may be effected by simply raising or lowering the end carrying the handle or by raising or lowering the cart, when the axle and wheels will gravitate from the one position to the other.

Modifications in detail, proportions of parts etc., may be resorted to without departing from the spirit of the invention or sacrificing any of its advantages.

It is evident that the cart may be pushed or drawn, and the foregoing description is based upon the assumption that it is to be pushed; so that the mother or nurse may have an eye on the child; but it will be readily understood that when the cart is pulled what has hereinbefore been designated as the "front" of the cart will be the rear.

What is claimed as new is:—

1. A baby cart embodying a platform, wheels, members supported by the platform and having lateral portions, seat-supporting springs, earth-engaging portions carried by said springs, and an axle mounted above the platform in said members to hold the platform in raised or lowered position and having offset portions engageable beneath said lateral portions, the arrangement being such that the wheels rest upon the supporting surface in both the elevated and lowered positions of the platform.

2. A baby cart embodying a platform, wheels, an axle with offset portions, and members fixed to the platform and having vertical and offset portions at their upper ends, the axle being supported above the said platform and the axle being revolubly mounted in the vertical portions of said members and the offset portions of the axle engageable with said upper offset portions of said members.

3. A baby cart embodying a platform, wheels, means supported above the platform and comprising vertical portions forming bearings for an axle and lateral portions, and an axle adjacent its ends revolubly supported in said vertical portions and having offset ends engageable beneath the offset portions of said means.

4. A baby cart embodying a platform, wheels, an axle having offsets at its ends, and axle mountings having lateral upper and lower portions, the lower portions being secured to the platform and the upper portions being disposed over the axle for engagement with its offsets in one position of the platform.

5. A baby cart comprising a platform, an axle having offset portions, wheels on said axle, means on said platform for gravitatingly mounting the axle to permit of holding the platform in elevated or lower position with the wheels resting on the supporting surface in both elevated and lowered position of the cart with said wheels disposed at substantially the mid length of the platform, the axle being mounted above the platform and the axle mounting means having portions for cooperation with the offsets of the axle.

6. A baby cart comprising a platform, an offset axle, wheels on said axle, mountings for the axle on the platform, the axle being mounted on said mountings above the platform, and the axle mountings having portions to contact with the offsets of the axle in both the raised and lowered position of the platform, and an operating handle connected with one end of the platform.

In testimony whereof I affix my signature.

JAMES R. MILLEN.